(12) United States Patent
Henry et al.

(10) Patent No.: US 8,926,913 B2
(45) Date of Patent: Jan. 6, 2015

(54) PARTICULATE FILTER WITH LOW SOOT LOADED COATING

(75) Inventors: David Henry, Morigny-Champigny (FR); Maxime Moreno, St. Ange le Vieil (FR); Christophe Michel Remy, Corning, NY (US)

(73) Assignee: Corning Incorporated, Corning, NY (US)

( * ) Notice: Subject to any disclaimer, the term of this patent is extended or adjusted under 35 U.S.C. 154(b) by 526 days.

(21) Appl. No.: 12/788,674

(22) Filed: May 27, 2010

(65) Prior Publication Data

US 2010/0303677 A1     Dec. 2, 2010

Related U.S. Application Data

(60) Provisional application No. 61/182,313, filed on May 29, 2009.

(51) Int. Cl.
    *B01D 50/00*        (2006.01)

(52) U.S. Cl.
    USPC .......................................... 422/180; 422/177

(58) Field of Classification Search
    CPC ..... F01N 3/0232; F01N 3/0222; F01N 3/035; B01D 2255/206; B01D 2255/102; B01D 2255/20707; B01D 2255/55; B01D 2255/902
    USPC ........... 422/177, 180; 208/209; 502/300, 302, 502/305, 353, 355
    See application file for complete search history.

(56) References Cited

U.S. PATENT DOCUMENTS

| | | | |
|---|---|---|---|
| 6,936,561 B2 | 8/2005 | Marquez et al. | |
| 6,991,720 B2 * | 1/2006 | Caze et al. | 208/209 |
| 7,048,894 B2 | 5/2006 | Tanaka et al. | 422/177 |
| 7,062,904 B1 * | 6/2006 | Hu et al. | 60/286 |
| 7,097,817 B2 * | 8/2006 | Brisley et al. | 423/245.3 |
| 7,122,612 B2 | 10/2006 | Tao et al. | |
| 7,204,965 B2 | 4/2007 | Okawara et al. | 422/177 |
| 7,306,771 B2 | 12/2007 | Okawara | 422/177 |
| 7,674,498 B2 | 3/2010 | Tao et al. | 427/388.2 |
| 7,763,222 B2 * | 7/2010 | Miyairi et al. | 423/239.1 |
| 8,158,195 B2 | 4/2012 | Morisaka et al. | |

(Continued)

FOREIGN PATENT DOCUMENTS

| | | |
|---|---|---|
| CN | 1474043 | 2/2004 |
| CN | 1490500 | 4/2004 |

(Continued)

OTHER PUBLICATIONS

Schaefer-Sindlinger, A., et al, "Efficient Material Design for Diesel Particulate Filters," Topics in Catalysis, Kluwer Academic Publishers-Plenum Publishers, NE, vol. 42-43, No. 1-4, May 1, 2007, pp. 307-317.

(Continued)

*Primary Examiner* — Tom Duong
(74) *Attorney, Agent, or Firm* — Robert P. Santandrea

(57) ABSTRACT

A ceramic particulate filter having a porous catalytic material deposited on walls within the filter. Particulate matter is trapped in the walls of the filter and the catalytic material removes gases, such as nitrogen oxides (NOx), from gases passing through the filter. The filter, in one embodiment, is adaptable for use with internal combustion (gas and diesel) engines. A method of making the filter is also described.

15 Claims, 8 Drawing Sheets

(a) Prior art      (b)

(56) References Cited

U.S. PATENT DOCUMENTS

| | | |
|---|---|---|
| 8,444,739 B2 | 5/2013 | Mizuno et al. |
| 2003/0101718 A1* | 6/2003 | Pfeifer et al. ............... 60/299 |
| 2003/0108465 A1* | 6/2003 | Voss et al. ............... 423/213.2 |
| 2004/0175315 A1* | 9/2004 | Brisley et al. ............ 423/239.1 |
| 2007/0077190 A1 | 4/2007 | Ohno |
| 2007/0224092 A1* | 9/2007 | Miyairi et al. ............. 422/180 |
| 2008/0138273 A1* | 6/2008 | Jiang ......................... 423/645 |

FOREIGN PATENT DOCUMENTS

| | | |
|---|---|---|
| CN | 101098898 | 1/2008 |
| EP | 0 736 503 A1 | 9/1996 |
| EP | 1371826 A2 | 12/2003 |
| EP | 1775022 A1 | 4/2007 |
| JP | 2003080080 | 3/2003 |

OTHER PUBLICATIONS

Schaefer-Sindlinger A., et al, "Efficient material design for diesel particulate filters," Topics in Catalysis, Kluwer Academic Publishers-Plenum Publishers, NE, vol. 42-43, No. 1-4, May 1, 2007, pp. 307-317.

European Patent Office, Office Action re: Application No. 10 721 897.6, Jul. 19, 2013, pp. 1-4.

Japanese Office Action dated Jan. 28, 2014, for JP Patent Application No. 2012-513150.

The State Intellectual Property Office of The People's Republic of China; Notice on The First Office Action; Nov. 14, 2013; pp. 1-7.

* cited by examiner

FIG. 2
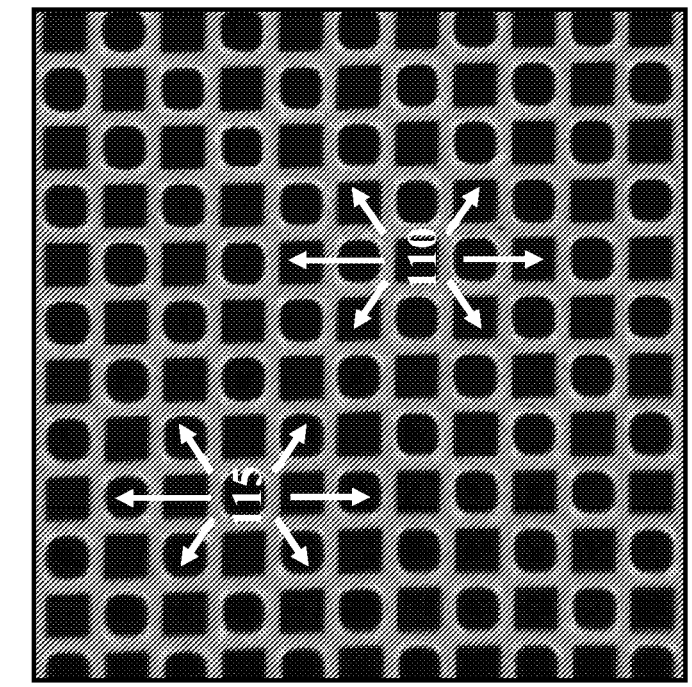
(b)
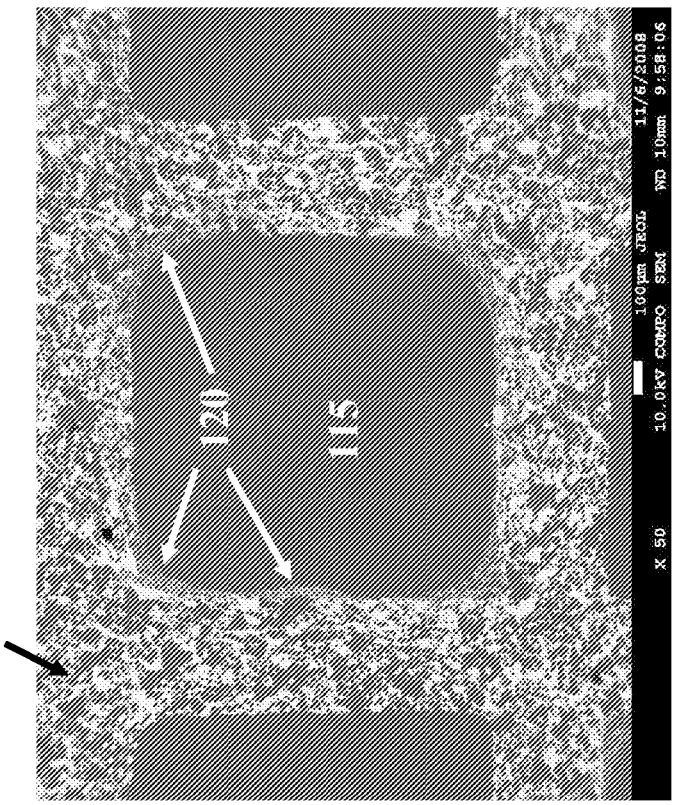
(a)

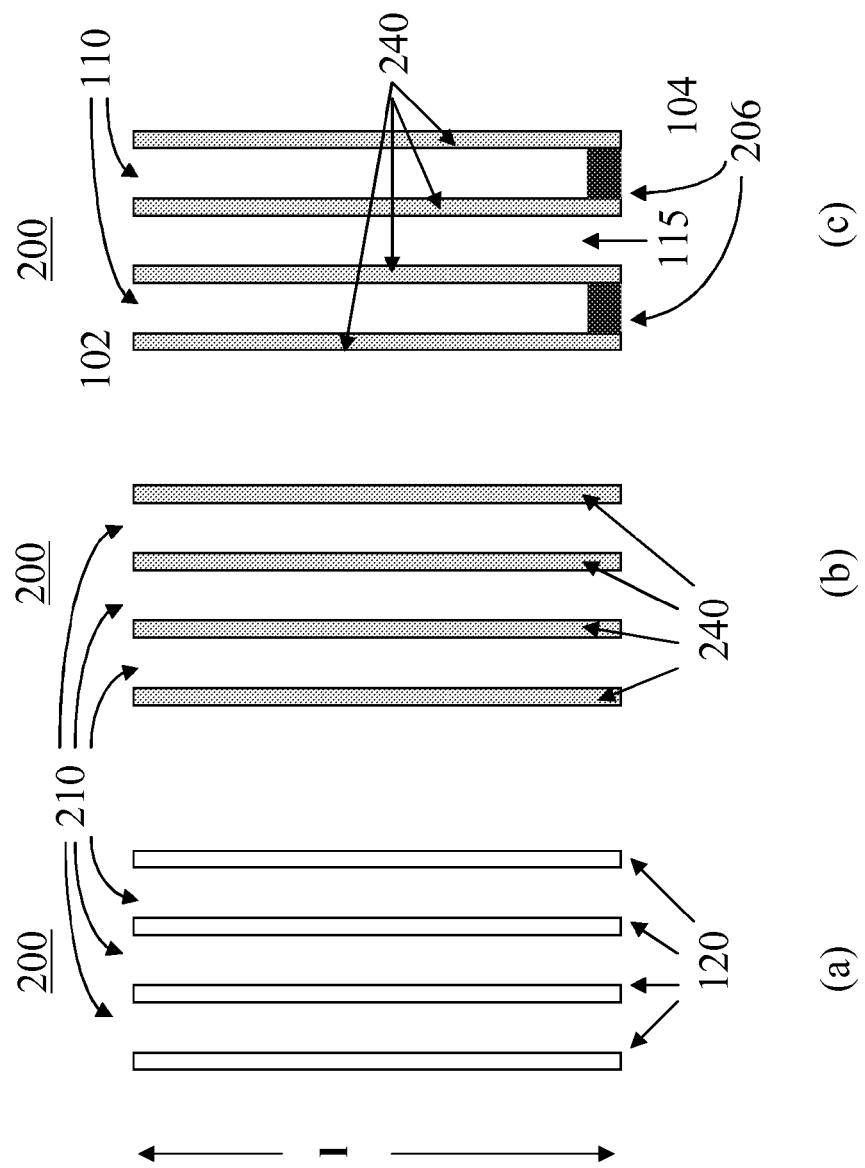

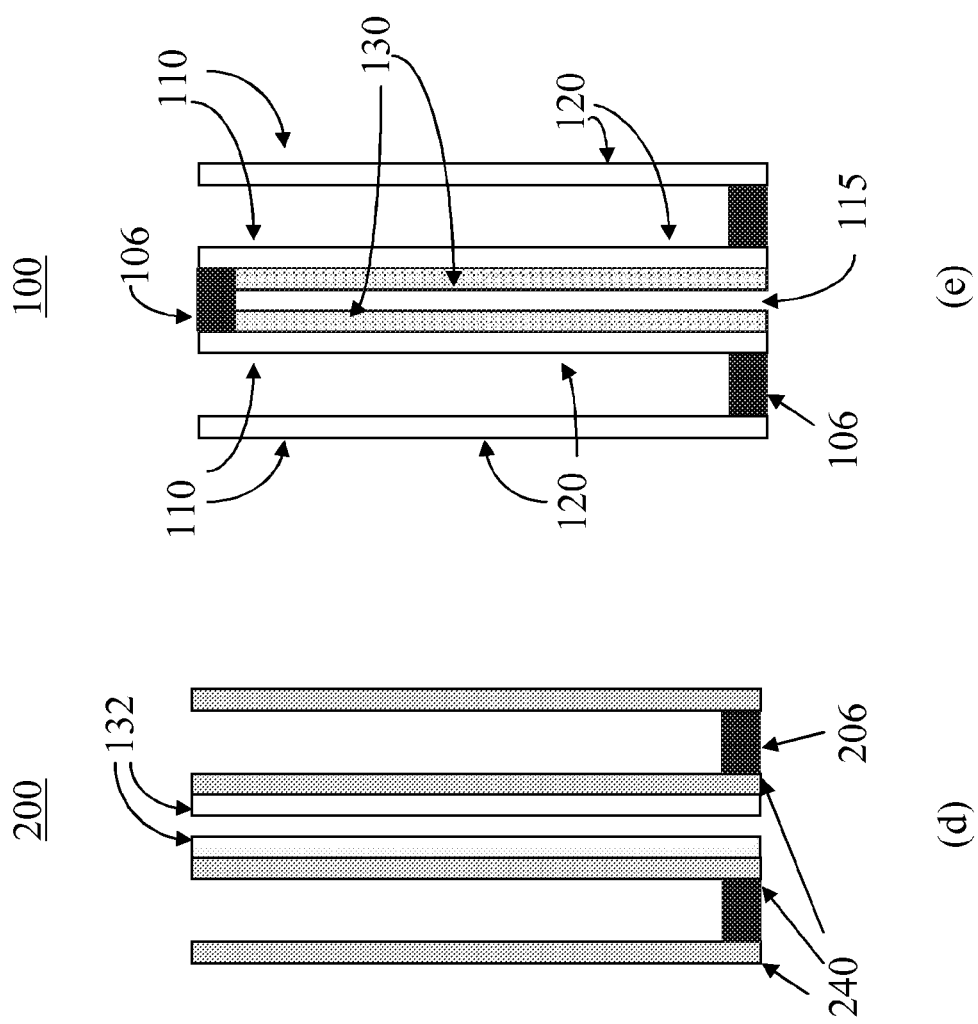

PARTICULATE FILTER WITH LOW SOOT LOADED COATING

CROSS-REFERENCE TO RELATED APPLICATIONS

This application claims the benefit of priority under 35 U.S.C. §119(e) of U.S. Provisional Application Ser. No. 61/182,313, filed on May 29, 2009.

BACKGROUND

Diesel engines require reduction of particulate matter (PM) and nitrogen oxide (NOx) emissions. Future original equipment (OE) for diesel engines will include both NOx catalysts (DeNOx catalysts) and PM after-treatment systems to meet low NOx and PM limits. Because multiple components are needed, however, exhaust systems become more complex and space consuming.

One approach to meet the need for combined PM and NOx control has been to integrate a DeNOx catalyst within a diesel particulate filter (DPF) to reduce volume and decrease backpressure penalty. In this approach, the catalyst and DPF are integrated by loading the catalyst within the DPF wall porosity. However, this type of catalyst addition adversely affects soot-loaded backpressure, even for very high porosity filters (≥65% porosity), which, in addition, are challenging to produce. Such backpressure imposes a severe fuel consumption penalty and complicates regeneration of the DPF.

SUMMARY

A ceramic particulate filter having a porous catalytic material deposited on walls within the filter is provided. Particulate matter is trapped in the walls of the filter and the catalytic material removes gases, such as nitrogen oxides (NOx), from gases passing through the filter. The filter, in one embodiment, is adaptable for use with internal combustion (gas and diesel) engines. A method of making the filter is also described.

Accordingly, one aspect of the disclosure is to provide a ceramic particulate filter. The ceramic particulate filter comprises: a ceramic body, the ceramic comprising a plurality of inlet channels, a plurality of outlet channels, and a plurality of porous walls separating the inlet channels from adjacent outlet channels, wherein each of the porous walls has a continuous porous structure capable of trapping particulate matter; and a porous catalytic coating deposited on an outer surface of the porous walls. Each of the inlet channels is in fluid communication with at least one of the outlet channels through the catalytic coating and the porous wall separating the inlet channel from the outlet channel.

Another aspect of the disclosure is to provide a catalytic coating for a ceramic particulate filter. The catalytic coating comprises a porous ceramic support material and a catalytic material disposed on the porous ceramic support material. The catalytic coating has a macroporosity in a range from about 15% up to about 70% and is disposable on a surface of at least one of an outlet channel and an inlet channel of the ceramic particulate filter.

A third aspect of the disclosure is to provide a method of making a ceramic particulate filter. The method comprises the steps of: providing a ceramic body, the ceramic body comprising a plurality of inlet channels, a plurality of outlet channels, and a plurality of porous walls separating the inlet channels from adjacent outlet channels; and coating an outer surface of each of the porous walls in at least one of the inlet channels and the outlet channels with a porous catalytic material to make the ceramic particulate filter.

A fourth aspect of the disclosure is to provide a method of making a porous multilayer ceramic article. The method comprises the steps of: providing a ceramic body, the ceramic body comprising at least one porous wall; filling pores in the porous wall with an intermediate material; coating an outer surface of the porous wall with a second porous material; and removing the intermediate material from the pores in the porous wall to form the porous multilayer ceramic article.

These and other aspects, advantages, and salient features will become apparent from the following detailed description, the accompanying drawings, and the appended claims.

BRIEF DESCRIPTION OF THE DRAWINGS

FIG. 2a is a microscopic image of a cross-section of a single outlet channel of a ceramic particulate/catalytic filter having a porous catalytic layer deposited on porous walls;

FIG. 2b is a microscopic image of a cross-section of a ceramic particulate/catalytic filter in which a porous catalytic layer is deposited on porous walls of the outlet channels;

FIGS. 3a-e is a schematic representation of a method of making a ceramic particulate/catalytic filter;

DETAILED DESCRIPTION

Figure 1:
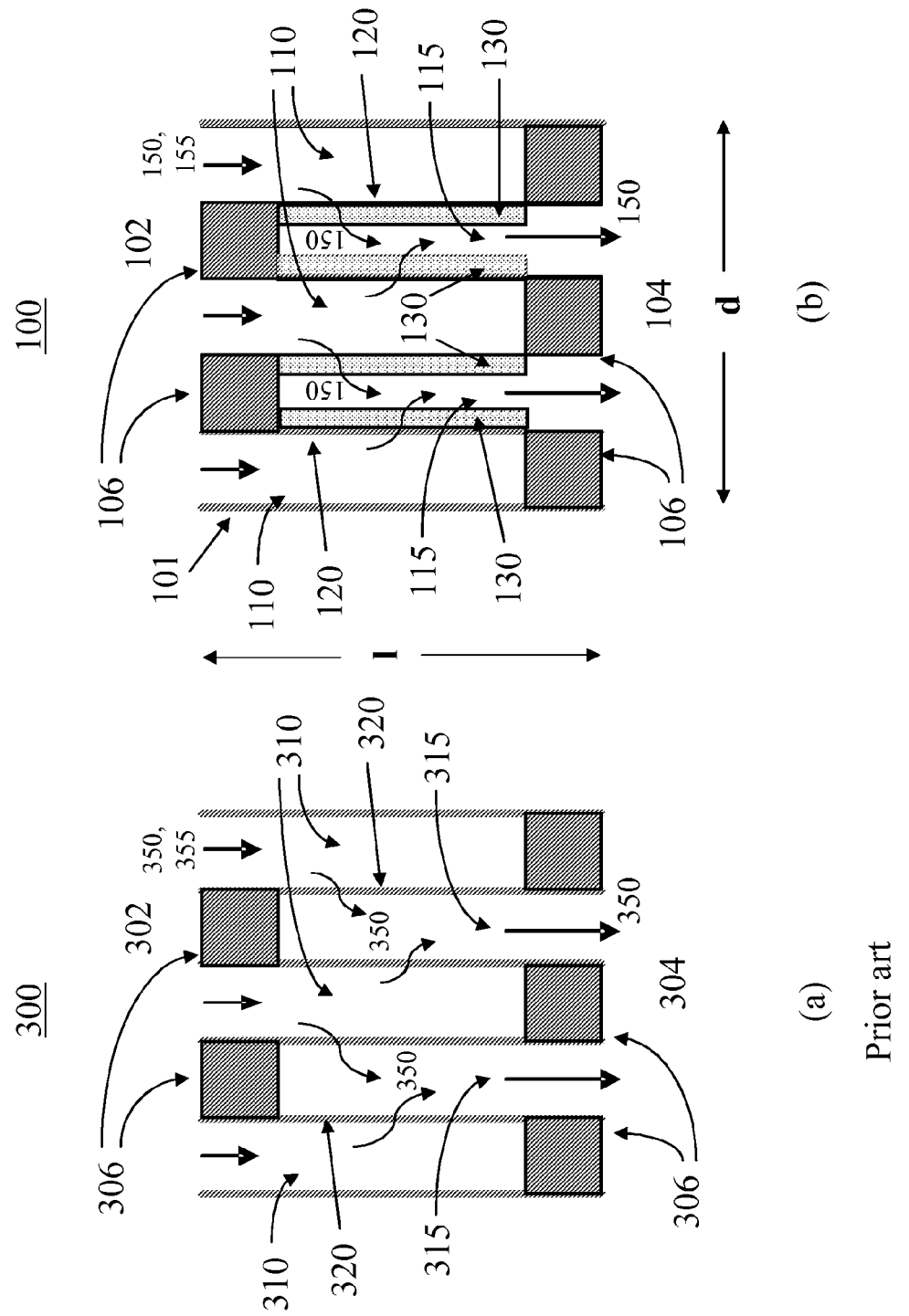
FIG. 1a is a schematic representation of a ceramic particulate filter of the prior art.
FIG. 1b is a schematic view of a ceramic particulate/catalytic filter.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any sub-ranges therebetween.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

A schematic representation of a ceramic particulate filter of the prior art is shown in FIG. 1a. Prior art ceramic particulate filter 300 comprises a ceramic material such as cordierite, aluminum titanate, silicon carbide, mullite, or the like. Prior art ceramic particulate filter 300 has an inlet face 302 and outlet face 304. A plurality of inlet channels 310 extend from inlet face 302 to the opposite end (i.e., outlet face 304) of prior art ceramic particulate filter 300. Inlet channels 310 are open at inlet face 302, thus allowing gases 350 and particulate matter 355 to enter inlet channels 310, and are plugged at outlet face 304 by plugs 306, for example, to prevent the exit of gases 350 and particulate matter 355 from inlet channels 310 at outlet face 304. Outlet channels 315 extend the length of prior art ceramic filter 300 from outlet face 304 to inlet face 302. Outlet channels 315 are open at outlet face 304, thus allowing gases 350 to exit outlet channels 315, and are plugged at inlet face 302 by plugs 306, for example, to prevent the exit of gases and matter through outlet channels 315 at inlet face 302.

In prior art ceramic particulate filter 300, adjacent channels—whether they are inlet channels 310 or outlet channels 315—are separated from each other and are defined by porous walls 320. The array of inlet channels 310 and outlet channels 315 defined by porous walls 320 typically form a honeycomb-like structure. Porous walls 320 comprise a porous ceramic material and have an open, continuous, and tortuous porosity that enables gases 350 to pass from inlet channels 310 to outlet channels 315 through porous walls 320; i.e., inlet channels 310 and outlet channels 315 are in fluid communication with each other through porous walls 320. At the same time, the porosity of porous walls 320 is sufficiently small to prevent most particles 355 from passing through porous walls 320 to outlet channel 315. Consequently, particles 355 accumulate either on the outer surface of porous walls 320, in inlet channels 310, or in porosity within porous walls 320.

Figure 4:
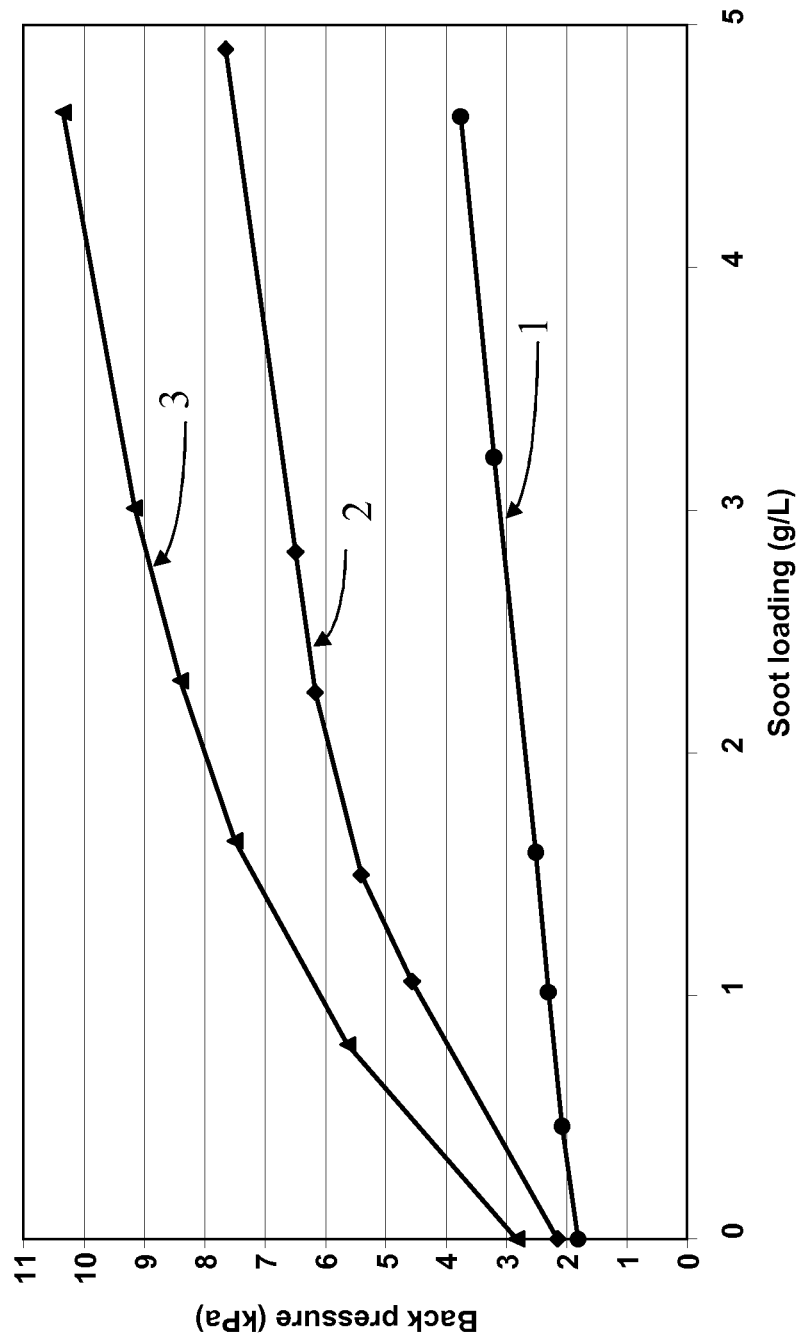
FIG. 4 is plot of soot-loaded backpressure as a function of soot loading for prior art ceramic particulate filters having: 1) no catalytic material loaded in the porosity within the filter walls; 2) a 92 g/l loading of catalytic material loaded in the porosity within the filter walls; and 3) a 122 g/l loading of catalytic material in the porosity of the filter walls.

Attempts have been made to integrate exhaust emission-reducing catalysts into prior art ceramic particulate filters 300 by loading the catalytic material within porous walls 320. This, however, adversely affects the soot-loaded backpressure (i.e. pressure developed in inlet channels 310 as a result of plugging of porosity of porous walls 320) within prior art ceramic particulate filter 300, even when porous walls 320 have high porosity (i.e., ≥65%). Examples of soot-loaded backpressure for ceramic particulate filters 300 in which catalytic material is loaded into porous walls 320 are plotted in FIG. 4. Data for prior art ceramic particulate filters having: 1) no loading of catalytic material in wall porosity (i.e., "bare"); 2) a 92 g/l loading of catalytic material in wall porosity; and 3) a 122 g/l loading of catalytic material in wall porosity are plotted as a function of soot loading in FIG. 4. With increasing loading of catalytic material in the wall porosity, backpressure increases, resulting in increased fuel consumption and making regeneration of the filter difficult.

A ceramic particulate/catalytic filter that decreases the backpressure penalty is provided and described herein. As used herein, the terms "ceramic particulate filter" and "ceramic particulate/catalytic filter" are equivalent terms and are used interchangeably, unless otherwise specified. The ceramic particulate/catalytic filter 100 comprises a ceramic body 101, a schematic axial view of which is shown in FIG. 1b. The ceramic body 101 has a length l and comprises a ceramic material such as, but not limited to, cordierite (magnesium iron aluminum silicate), aluminum titanate, silicon carbide, mullite, combinations thereof, or the like, and in one embodiment, has a honeycomb structure. Ceramic body 101 has an inlet face 102, and outlet face 104, each having a diameter d. A plurality of inlet channels 110 extend from inlet face 102 to the opposite end (i.e., outlet face 104) of ceramic body 101. Inlet channels 110 are open at inlet face 102, thus allowing gases 150 and particulate matter 155 to enter inlet channels 110 and ceramic body 101, and are plugged at outlet face 104 by plugs 106, for example, to prevent the exit of gases 150 and particulate matter 155 from inlet channels 110 at outlet face 104. Outlet channels 115 extend the length l of ceramic body 101 from outlet face 104 to inlet face 102. Outlet channels 115 are open at outlet face 104, thus allowing gases 150 to exit outlet channels 115, and are plugged at inlet face 102 by plugs 106, for example, to prevent the exit of gases 150 and matter through outlet channels 115 at inlet face 102.

Adjacent channels—whether they are inlet channels 110 or outlet channels 115—are separated from each other and are defined by porous walls 120. The array of inlet channels 110 and outlet channels 115 defined by porous walls 120 form a honeycomb-like structure, typically comprising a plurality of cells. In some embodiments, such cells have either a square or hexagonal cross-section. Porous walls 120 comprise a porous ceramic material and have an open, continuous, and tortuous porosity that enables gases 150 to pass from inlet channels 110 to outlet channels 115 through porous walls 120; i.e., inlet channels 110 and outlet channels are in fluid communication with each other through porous walls 120. At the same time, the porosity of porous walls 120 is sufficiently small to prevent most particles 155 from passing through porous walls 120 to outlet channel 115. Particles 155 such as, for example, soot particles found in diesel exhaust, therefore remain in inlet channels 110 or trapped in porous walls 120 and are eventually "burned out" of ceramic body 101 during regeneration of ceramic particulate/catalytic filter 100. Porous walls 120 have a mean pore size ranging from about 5 μm up to about 30 μm and a porosity ranging from about 35% up to about 70%. Each of porous walls 120 has a thickness in a range from about 0.005 inch (about 125 μm) up to about 0.025 inch (about 635 μm).

Ceramic body 101 can, in one embodiment, be formed by extruding a green body comprising inorganic ceramic-forming materials, binders, water, pore formers, and the like that are known in the art and firing the green body to form the hard, ceramic body having the desired composition and porosity. Typical ceramic-forming materials include, but are not limited to, sources of alumina, silica, magnesia, titania, and silica that are known in the art. Non-limiting examples of binders that can be used in the formation of ceramic body 101 include organic binders such as cellulose containing materials, including methylcellulose, methylcellulose derivatives, combinations thereof, and the like. Pore formers include carbonaceous pore formers such as, but not limited to, carbon (such as, for example, graphite, activated carbon, petroleum coke, and carbon black), starch (such as, for example, corn, barley, bean, potato, rice, tapioca, pea, sago palm, wheat, canna, and walnut shell flours or starches), and polymers (such as, for example, polybutylene, polymethylpentene, polyethylene (preferably beads), polypropylene (preferably beads), polystyrene, polyamides (nylons), epoxies, ABS, Acrylics, and polyesters (PET). Such pore formers can be either uncatalyzed or, alternatively, catalyzed by metals in either elemental or in compound form. Such catalysts are described in U.S. patent application Ser. No. 12/470,535, by Phillippe Barthe et al., entitled "Methods of Making Ceramic Bodies using Catalyzed Pore Formers and Compositions for Making the Same," filed May 22, 2009, the contents of which are incorporated herein by reference in their entirety.

A porous catalytic coating 130 is deposited on an outer surface of porous walls 120, rather than in the porosity within porous walls 120, in at least a portion of outlet channels 115, inlet channels 110, or both inlet and outlet channels 110, 115. Porous catalytic coating 130, in various embodiments, covers at least a portion of the outer surfaces of porous walls 120. Consequently, the overall increase in backpressure is less than that seen when the catalytic layer is deposited within the wall porosity. The permeability of porous walls 120 is not modified by the presence of catalytic coating 130. As with porous walls 120, porous catalytic coating 130 has an open, continuous, and tortuous porosity that enables gases 150 to pass from inlet channels 110 to outlet channels 115 through porous walls 120 and porous catalytic coating 130; i.e., inlet channels 110 and outlet channels are in fluid communication with each other through porous walls 120 and porous catalytic coating 130. In one embodiment, porous catalytic coating 130 is disposed on the surface of porous walls 120 in outlet channels 115. Porous catalytic coating 130 has a thickness that is sufficient to achieve the desired activity of the catalytic material. In one embodiment, porous catalytic coating 130 has a thickness of up to about 400 μm. In another embodiment, porous catalytic coating 130 has a thickness in a range from about 30 μm up to about 400 μm and, in another embodiment, in a range from about 70 μm up to about 400 μm. In general, catalytic coatings are mesoporous, having pore sizes in the 50 nanometer range. The catalytic coating 130, in one embodiment, has pore sizes greater than about 1 μm, and a macroporosity (i.e., pore sizes greater than 1 μm) that ranges from about 15% up to about 70%. To ensure that catalytic coating 130 has sufficient porosity, slurries or washcoats of materials that are typically used to form catalytic coating 130, in one embodiment, include at least one pore former, such as, but not limited to, those pore formers previously described herein.

A cross-sectional microscopic image (50× magnification) of a single open outlet channel 115 having a porous catalytic coating 130 deposited on porous walls 120, as described herein, is shown in FIG. 2a. FIG. 2b is a microscopic image of a cross-section of a ceramic particulate/catalytic filter 100 in which a porous catalytic layer is deposited on porous walls 120 of outlet channels 115. The arrangement of inlet channels 110 and outlet channels 115 within ceramic particulate/catalytic filter 100 can be seen in FIG. 2b. Outlet channels 115 having catalytic coating 130 have cross-sections that are circular in appearance, whereas inlet channels 110, which do not have a catalytic coating, have a square cross-section.

Porous catalytic coating 130 comprises at least one catalytic material. The catalytic material, in one embodiment, comprises, consists essentially of, or consists of any catalyst known in the art for reducing emissions, such as DeNOx or other oxidation catalysts, in diesel or gasoline internal combustion engines. Such catalytic materials include, but are not limited to, oxidation catalysts (DOCs), lean NOx traps, selective catalytic reduction (SCR) catalysts, combinations thereof, and the like that are known in the art. As used herein, NOx, or nitrogen oxides, refers to the reactive gases that are formed through high temperature combustion processes. Non-limiting examples of such catalytic materials include the precious metal catalysts of Group VIII (e.g., Pt, Rh, Pd, Ir, Ni), as well as the transition metals of Groups IVB, VB, VIB, VIIB and VIIIB, rare earth metals, compounds thereof, combinations thereof, and zeolites. In one embodiment, catalytic coating 130 includes a porous support material. The porous support material is disposed on the outer surface of porous walls 120 and the catalytic material is either deposited on or incorporated within the porous support material. The porous support comprises at least one of alumina, titania, silica, zeolite, zirconia, activated carbon, and combinations thereof. Catalytic layers, support materials, and methods of making structured catalysts are described in U.S. Pat. No. 6,991,720, by Phillippe Caze et al., entitled "Structured Catalysts Incorporating Thick Washcoats and Method," filed Feb. 28, 2003, and issued on Jan. 31, 2006; and U.S. Pat. No. 6,936,561, by Paulo Marquez et al., entitled "Monolithic Zeolite Coated Structures and a Method of Manufacture," filed Feb. 28, 2003, and issued on Aug. 30, 2005; the contents of which are incorporated by reference herein in their entirety.

In another embodiment, a second porous catalytic layer (not shown) is deposited either on the surface of porous walls 120 in inlet channels 110, within the continuous or open porosity in porous walls 120, over catalytic coating 130 in outlet channels 115, or in any combination thereof. The second catalytic layer, can comprise a second catalytic material that is different from the catalytic material in catalytic coating 130. For example, a lean NOx trap (LNT) catalyst can be loaded in either outlet channels 115 or inlet channels 110. During operation, the LNT catalyst will create ammonia ($NH_3$), which is then used as a reducing agent for a selective catalytic reduction (SCR) catalyst, located in a layer disposed either on top of the LNT catalytic layer (where the LNT-containing catalytic layer is located in outlet channels 115) or, where the LNT-containing catalytic layer is located in inlet channels 110, in outlet channels 115. In another non-limiting example, a DOC catalyst or catalytic layer can be loaded in the continuous or open porosity within porous walls 120 and a SCR catalyst or catalytic layer deposited on the surface of porous walls 120 in outer channels 115.

Ceramic body 101 may be configured to further improve performance of ceramic particulate/catalytic filter 100. Inlet channels 110 and outlet channels 115 can, in one embodiment, consist of hexagonal rather than square cells to provide outlet and/or inlet channels 115, 110 with a more uniform coating of catalytic coating 130. In another embodiment, ceramic body 101 has thinner porous walls 120 to further reduce the impact of backpressure. This feature can be combined with coating outlet channels 115 with a thicker catalytic coating 130, which increases the apparent bulk density and reduces the risk of damage due to exposure to excessive temperatures during, for example, regeneration of ceramic particulate/catalytic filter 100.

Figure 6:
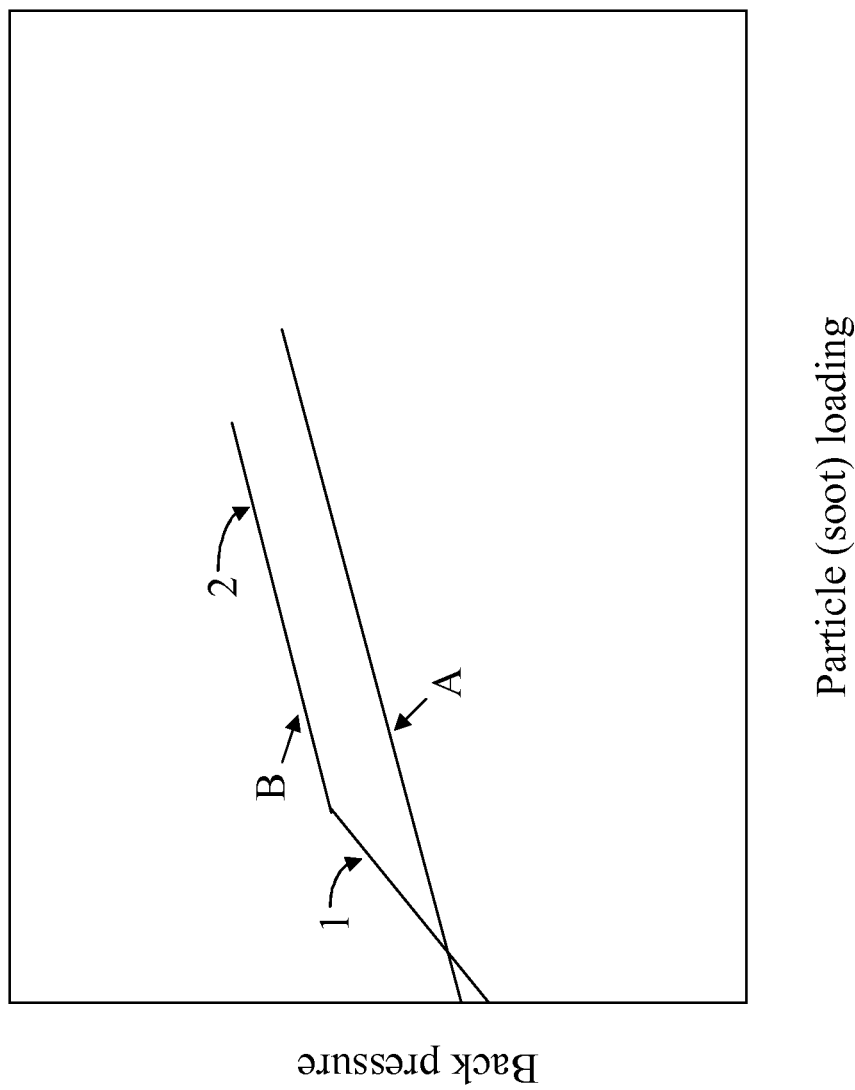
FIG. 6 is a schematic representation of backpressure plotted as a function of soot or particle loading for deep bed filtration followed by cake filtration (B), and cake filtration only (A)

In one embodiment, catalytic coating 130 is deposited on the outer surface of porous walls 120 in inlet channels 110. In this instance, deposition of particulate matter 155, such as soot and the like, in the porosity within porous walls 120 is prevented. Instead, particulate matter 155 deposits on the surface, or within surface porosity, of catalytic coating 130, preventing the significant increase in backpressure (i.e., pressure drop across porous walls 120) observed in conventional filters. This initial increase in backpressure—also referred to as "deep bed filtration"—is usually associated with the deposition of particulate matter in the porosity within porous walls 120. An example of deep bed filtration behavior followed by "cake filtration (accumulation of particulate matter on the surface and in surface porosity)" as a function of soot or particulate loading is schematically shown as line B in FIG. 6. As soot loading increases, internal porosity within the porous walls of the particulate filter is filled with particulate matter (region 1 in line B) and the backpressure increases sharply. This initial stage is followed by an increase at a lower rate after the porosity is filled and particulate matter deposits on the outer surfaces of the walls (region 2 in line B). Compared to conventional loading of catalytic material within the wall porosity of a particulate filter, the accumulation of particulate matter 155 on the surface and in surface porosity ("cake filtration") of catalytic coating 130, without deep bed filtration, results in reduced backpressure/pressure drop and more linear behavior of the increase in backpressure/pressure drop as function of soot loading (line A in FIG. 6). The rate of backpressure increase due to cake filtration alone is less than that observed in deep bed filtration (region 1, line B, in FIG. 6). The linear response of backpressure with respect to soot loading is beneficial in those instances where ceramic particulate catalytic is used in internal combustion systems.

Figure 7:
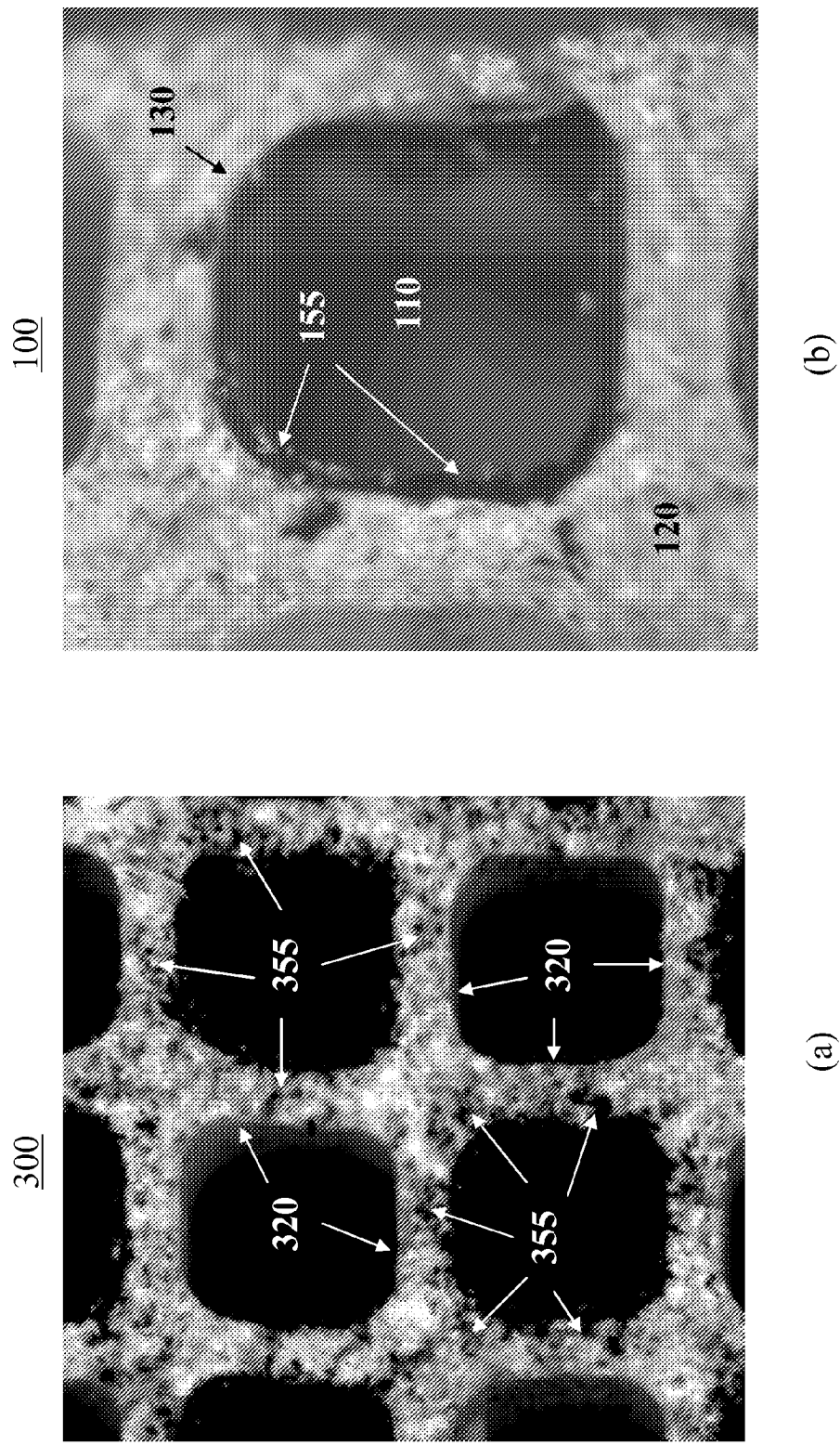
FIG. 7a is a micrograph of a cross-section of a prior art diesel particulate filter in which particulate matter has accumulated by deep bed filtration in the porosity within the walls separating inlet and outlet channels.
FIG. 7b is a micrograph of a cross-section of an inlet channel of a ceramic particulate/catalytic filter having a catalytic coating deposited on the surface of the porous walls of the channel.

Examples of deep bed filtration and cake filtration are shown in FIGS. 7a and b, respectively. FIG. 7a is a micrograph of a cross-section of a prior art diesel particulate filter 300 in which particulate matter (soot) 355 has accumulated in the porosity within the walls 320 separating inlet and outlet channels 310, 315 by deep bed filtration. FIG. 7b is a micrograph of a cross-section of an inlet channel 110 of the ceramic particulate/catalytic filter 100 described herein, having a catalytic filter 130 deposited on the surface of porous walls 120. A layer or "cake" of particulate matter 155, deposited by cake filtration, is deposited on the surface of catalytic coating 130.

Compared to conventional loading of catalytic material within the wall porosity of the particulate filter, depositing catalytic coating 130 (which includes the catalytic material) on the outer surface of porous walls 120 and, particularly, on the outer surface of porous walls in outlet channels 115, offers several advantages. Whereas the presence of catalytic material in wall porosity leads to interaction with particulates (e.g., soot and ash) that adversely affect the efficiency of NOx conversion, the deposition of catalytic coating 130 and loading of the catalytic material in outlet channels 115 prevents such interaction.

One aspect of integrating catalytic materials into particulate filters is temperature management of the catalytic material/catalytic coating 130 during regeneration (i.e., heating up of the particulate filter to remove particulate matter from wall porosity) of the particulate filter to prevent deactivation of catalytic materials. By loading or depositing the catalyst/catalytic coating 130 in outlet channels 115, the catalytic material experiences temperature excursions during regeneration of the particulate filter that are less than those observed when the catalyst is loaded within the wall porosity. The catalytic material/catalytic coating 130 disposed in outlet channels 115 is therefore less likely to become deactivated due to overheating during regeneration.

Because gases 150 travel across the catalytic coating 130 and do not leach the top of catalytic coating 130, mass transfer and activity of the catalytic material/catalytic coating 130 is greater than that of a conventional flow-through substrate coated with the catalytic material.

In one embodiment, ceramic particulate/catalytic filter 100 is a filter for controlling the exhaust emissions—both gaseous and particulate—created by internal combustion engines; i.e., gasoline and diesel powered engines. In other embodiments, ceramic particulate catalytic filter can be used to control emissions from other combustion systems such as, but not limited to, furnaces, gas turbines, and the like, that produce exhaust gases and/or particulate matter. In yet another embodiment, ceramic particulate/catalytic filter 100 may act as a catalytic support for use in chemical synthesis.

A method of making the ceramic particulate/catalytic filter 100 described herein is also provided. The method is schematically shown in FIG. 3a-e. In the first step (FIG. 3a), a ceramic substrate 200 is first provided. As previously described herein, ceramic substrate 200, comprises a ceramic material such as, but not limited to, cordierite (magnesium iron aluminum silicate), aluminum titanate, silicon carbide, mullite, or the like, and is typically an extruded honeycomb structure. Ceramic substrate 200 includes a plurality of porous walls 220 that define a plurality of channels 210 that extend through the length l of ceramic substrate 200.

To prevent deposition of the catalytic layer and catalytic material within the porous walls 220 of ceramic substrate 200, the continuous pore structure of porous walls 220, in one embodiment, is filled with an intermediate material 240 (FIG. 3b).

The intermediate material is a natural or synthetic polymer that is insoluble in water but soluble in organic solvents, such as esters, aromatic hydrocarbons, alcohols, ketones, chlorinated solvents, and, preferably, toluene/alcohol mixtures.

Thus, those polymers that are typically used as aqueous binders cannot serve as the intermediate material. The intermediate material can comprise, consist essentially of, or consist of polymers such as, but not limited to, polyolefins, polyvinylchlorides, polyvinylacetates, polyesters, polyacetals, fluorinated polymers, polysulfones, polyacrylates, phenolic resins, polyamides, polyurethanes, polycarbonates, styrenic homo- and copolymers, or the like that are insoluble in water. Water-insoluble polymers that are prepared from water soluble polymers modified with hydrophobic substituents are particularly suitable for use as the intermediate material.

In one embodiment, the intermediate material comprises, consists essentially of, or consists of alkylated cellulose derivatives, such as organo-soluble ethyl cellulose (EC), in which some of the hydroxyl groups on the repeating glucose units are converted into hydrophobic ethyl ether groups. EC is particularly suitable because it takes up very little water from moist air or during immersion. The small amount of water evaporates readily, leaving the ethyl cellulose unchanged. Insensitivity to water prevents the deposited intermediate material from re-dissolving during deposition of the second, water-based, porous ceramic/catalytic layer.

Ethyl cellulose is commercially available under the trade name AQUALON™, manufactured by Hercules, or ETHOCEL™, manufactured by Dow Chemical Company. AQUALON containing different amounts of ethyl cellulose (N-type (48.0-49.5% ethoxy); T-type (49.6-51.5% ethoxy); K-type (45.0-47.2% ethoxy); and X-type (50.5-52.5% ethoxy)) is available, and those formulations having >46.5% ethoxy are preferred. For example, ethyl cellulose having a viscosity of 4 to 300 cP, measured at 5% in 80/20 toluene/ethanol and having 48% ethoxy, is particularly suitable for use as the intermediate material.

In another embodiment, the continuous pore structure of porous walls 220 is not filled with an intermediate material 240. Instead, a catalytic coating is deposited or provided to the continuous pore structure of porous walls 220 using the methods described herein. The second catalytic coating can comprise either the same or different catalytic material as the catalytic coating 130 deposited on inlet channel 110 and/or outlet channel 115.

In the next step (FIG. 3c), a portion of channels 210 are either plugged or temporarily masked at outlet face 104 with plugs 206 using those methods known in the art to form a plurality of inlet channels 110, with outlet channels 115 remaining unplugged. Plugs 206 may comprise temporary or intermediate masking, such as Mylar™ or the like. Catalytic coating 130 is then deposited (FIG. 3d) in at least one of inlet channels and outlet channels 115 as a washcoat 132 by dipping ceramic substrate 200 at least once in a slurry comprising the porous support material, catalytic material, binders, and, optionally, at least one pore former, such as those previously described herein. Typical binders comprise a permanent binder component of the desired formulation that is present as either a dissolved compound or a well-dispersed solid having a particle size that is well below that of the bulk of the oxide powder forming the washcoat. In one embodiment, the binder is an alumina sol binder containing about 1 mole of alumina per liter of sol. Alternatively, other binders, such as Nyacol™, Condea™, or the like can be used as binders. In one embodiment, the catalytic material may be omitted from the slurry and be subsequently applied to the surface of the ceramic support, for example, as a washcoat of a second slurry. The actual number of times ceramic substrate 200 is dipped in the slurry depends on factors such as the viscosity of the slurry and the desired thickness of catalytic coating 130. After dipping ceramic substrate 200 in the slurry, ceramic substrate 200 is heated to remove the liquid from the deposited catalytic coating. Examples of such slurries are described in U.S. Pat. No. 6,991,720 and U.S. Pat. No. 6,936,561, previously referenced hereinabove. Alternatively, catalytic coating 130 may be deposited in inlet channels and/or outlet channels 110, 115 by other means known in the art. Water falling, for example, can be used to deposit catalytic layer in slurry form if ceramic substrate 200 is in an upside-down orientation.

Following application of the catalytic coating 130 is applied to outlet channels 115, the intermediate material 240 is removed from porous walls 120, Outlet channels 115 are permanently plugged with plugs 106 at inlet face 102 (inlet channels, if temporarily plugged or masked with plugs 206 in previous steps, are also permanently plugged with plugs 106) at outlet face 106. Ceramic particulate filter 100 is then formed by heating ceramic body 200, now plugged and having washcoats that form catalytic coating 130. In this step, ceramic body 100 is heated at a temperature that is sufficient to remove intermediate material from porous walls 120, and pore formers, binders, and any residual moisture from catalytic coating 130 (FIG. 3e) while avoiding deactivation of the catalytic material. The temperature at which ceramic particulate/catalytic filter 100 is heated depends upon the composition of the intermediate material 240, porous support material, binder, pore formers, and catalytic materials that are used to form catalytic coating 130. In one embodiment, ceramic particulate/catalytic filter 100 is heated at a temperature of at least 500° C. In one embodiment, ceramic body 200, intermediate material 240, and catalytic coating 130 are heated at a temperature in a range from about 500° C. up to about 600° C. and, in another embodiment, about 550° C. up to about 600° C., to form ceramic particulate filter 100.

A method of making a porous multilayer ceramic article, such as the ceramic particulate/catalytic filters described herein, is also provided. The multilayer ceramic material comprises at least two porous ceramic layers that allow the passage of a selected fluid (i.e., gas or liquid) through at least a portion of the article.

A ceramic body comprising at least one porous wall is first provided. The ceramic body may be formed by those means previously described herein, such as extrusion, or by other means known in the art, such as, but not limited to, molding, casting, slip casting, and the like. Next, pores within the porous wall are filled with an intermediate material to temporarily block off the porosity within the walls. Such intermediate materials and methods of filling the pores have been previously described herein. The outer surface of the porous wall is then coated with a second porous ceramic material. In one non-limiting example, the second porous ceramic material is applied to the surface of the porous walls as washcoat that can include previously described binders, pore formers, and the like. The intermediate material is then removed from the pores in the porous wall to form the porous multilayer ceramic article. This is typically achieved by heating the ceramic body, including the intermediate material and the porous second ceramic material, at a temperature and time that are sufficient to consolidate the second porous ceramic material into a continuous second porous layer or coating, and to remove the intermediate material, binders, and pore formers.

In one embodiment, the second porous layer or coating is capable of separating or filtering liquids or gases. In another embodiment, one of the porous wall and the second porous ceramic layer or coating is capable of trapping particulate matter such as, for example, in a filter for an internal combustion engine, such as a diesel particulate filter. In yet another embodiment, the second porous layer acts as a catalytic support for chemical processing.

EXAMPLE

The following example illustrates the features and advantages of the articles and methods described herein and is in no way intended to limit the disclosure and appended claims thereto.

In the following examples, Cordierite ceramic bodies/filters having a honeycomb structure were used. Each ceramic body had a diameter of 2 inches (about 50 mm), height of 3 inches (about 75 mm), and a 300/14 (300 cells/in$^2$, 0.014 inch wall thickness) honeycomb structure The porous walls of the ceramic bodies had a porosity of 67% and average pore size of 17 μm. The outlet face of each ceramic body/filter was plugged using those methods known in the art for plugging diesel particulate filters.

Ethyl cellulose (4 cp, Aldrich) was used as an intermediate material to temporarily fill the porosity within the walls of the ceramic bodies/filters. The intermediate material was loaded into the wall porosity by dipping each ceramic body/filter in a toluene/ethanol (80/20% by weight) solution containing 5% ethyl cellulose by weight, followed by heating at 120° C. for one hour to remove the solvent. Each ceramic body/filter was dipped in the solution one time to fill the wall porosity with the intermediate material.

A slurry comprising a catalytic support material, binder and pore former was prepared. The catalytic support material used was ZSM-5 (Zeolyst), a commercially available zeolite-based heterogeneous catalyst. ZSM-5 is an aluminosilicate zeolite having a high silica and low aluminum content, and a structure based upon channels with intersecting tunnels. The binder was synthesized according the methods described in U.S. Pat. Nos. 6,991,720 and 6,936,56, which have previously cited herein. A synthetic graphite powder (TIMCAL™ Timrex KS5-44) having a mean particle size of 26 μm was added to the slurry as a pore former. The amount of graphite powder added to the slurry was in a range from about 25% up to about 50% of the weight of ZSM-5.

The catalytic coating was deposited in the outer channels of the ceramic body/filter by repeatedly dipping of the ceramic body/filter in the slurry. Each dipping step was followed by drying to remove water. The coated ceramic body/filter with catalytic coating was heated at 120° C. for 2 hours, followed by heating at 900° C. for 6 hours to consolidate the catalytic layer and remove the intermediate material and pore former. Inlet channels were then plugged using those methods known in the art for plugging diesel particulate filters.

Parameters for loading the outer channels of ceramic body/filters with the catalytic coating are summarized in Table 1.

TABLE 1

Summary of processing parameters for loading outer channels of ceramic body/filters with catalytic material.

| | Sample | | |
|---|---|---|---|
| | A | B | C |
| Pore Former | 50 | 25 | 0 |
| Catalytic coating | ZSM-5 | ZSM-5 | ZSM-5 |
| Coating (dipping) steps | 6 | 6 | 4 |
| Coating Loading (g/l filter) | 53 | 47 | 57 |

Figure 5:
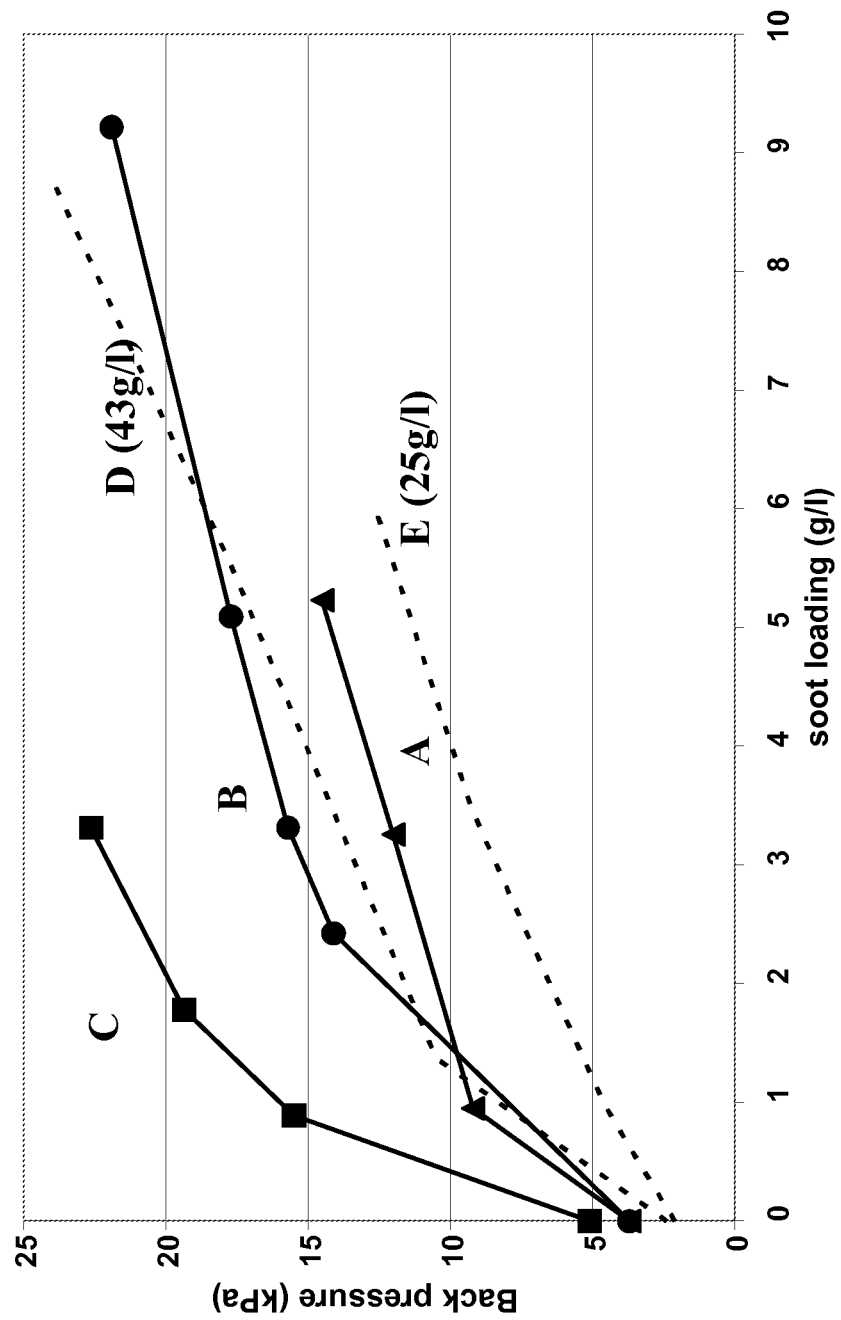
FIG. 5 is a plot of filter backpressure as a function of soot loading.

The effect of pore former on soot loaded backpressure was determined for samples A, B, and C, listed in Table 1. Backpressure is plotted as a function of soot loading for each sample shown in FIG. 5. For comparison, the backpressures of ceramic filters D and E (43 g/l and 25 g/l loadings of catalytic material, respectively) in which catalytic material was loaded into wall porosity, is also displayed in FIG. 5. As can be seen in FIG. 5, a higher backpressure is produced when the slurry that is used to form the present catalytic coating does not include a pore former (Sample C). As the amount of pore former is increased (Samples A and B), the backpressure decreases. In addition, catalytic layers formed on outer channels of the ceramic filters with the aid of pore formers (Samples A and B) have higher loadings of catalytic material (53 g/l and 47 g/l loadings of catalytic material) than Samples D and E, in which the catalytic material is loaded into wall porosity. Despite the higher loading, Sample A exhibits a backpressure that is less than that of Sample D. Similarly, Sample B exhibits a backpressure that is comparable to that of Sample D.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A ceramic particulate filter for internal combustion engines, the ceramic particulate filter comprising:
   a. a ceramic body comprising a plurality of inlet channels, a plurality of outlet channels, and a plurality of porous walls separating the inlet channels from adjacent outlet channels, wherein each of the porous walls has a continuous porous structure capable of trapping particulate matter; and
   b. a first porous catalytic coating comprising a first catalytic material and a porous support material, wherein the first catalytic material is incorporated within the porous support material, wherein the first porous catalytic coating is not deposited within the porous walls, and wherein each of the inlet channels is in fluid communication with at least one of the outlet channels through the first catalytic coating and the porous wall separating the inlet channel from the outlet channel; and
   c. a second porous catalytic coating deposited on the outer surfaces of the porous wall in the outlet channel, wherein the second porous catalytic coating is not deposited within the porous walls, wherein the second porous catalytic coating comprises a second catalytic material that differs from the first catalytic material, and wherein the first porous catalytic coating is deposited on top of the second porous catalytic coating in the outlet channel.

2. The ceramic particulate filter according to claim 1, wherein the second porous catalytic coating is further deposited on the outer surface of the porous wall in the inlet channel.

3. The ceramic particulate filter according to claim 2, wherein the second porous catalytic coating comprises at least one DeNOx catalyst.

4. The ceramic particulate filter according to claim 1, wherein the first catalytic material comprises at least one of an oxidation catalyst and a DeNOx catalyst.

5. The ceramic particulate filter according to claim 4, wherein the first catalytic material or the second catalytic material comprises at least one of a zeolite, a precious metal of Group VIII, a transition metal of Groups IVB, VB, VIB, VIIB or VIIIB, a rare earth metal, compounds thereof, and combinations thereof.

6. The ceramic particulate filter according to claim 1, wherein the first porous catalytic coating has a macroporosity in a range from about 15% up to about 70%.

7. The ceramic particulate filter according to claim 1, wherein the first porous catalytic coating has a thickness a range from about 30 μm up to about 400 μm.

8. The ceramic particulate filter according to claim 7, wherein the first porous catalytic coating has a thickness a range from about 70 μm up to about 400 μm.

9. The ceramic particulate filter according to claim 1, wherein the ceramic body comprises at least one of cordierite, aluminum titanate, silicon carbide, mullite, and combinations thereof.

10. The ceramic particulate filter according to claim 1, wherein the porous support material comprises at least one of alumina, titania, silica, zeolite, zirconia, activated carbon, and combinations thereof.

11. The ceramic particulate filter according to claim 1, wherein the ceramic particulate filter is adaptable for use as a filter for an internal combustion engine.

12. The ceramic particulate filter according to claim 1, further comprising an intermediate material filling the continuous porous structure of the porous walls.

13. The ceramic particulate filter according to claim 12, wherein the intermediate material comprises a polymer that is insoluble in water and soluble in an organic solvent.

14. The ceramic particulate filter according to claim 13, wherein the polymer comprises a polyolefin, a polyvinylchloride, a polyvinylacetate; a polyester, a polyacetal, a fluorinated polymer, a polysulfone, a polyacrylate, a phenolic resin, a polyamide, a polyurethane, a polycarbonate, a sytrenic homopolymer, a styrenic copolymer, or a combination thereof.

15. The ceramic particulate filter according to claim 12, wherein the intermediate material comprises an alkylated cellulose derivative.

* * * * *